US008725963B1

(12) United States Patent
Emelianov et al.

(10) Patent No.: US 8,725,963 B1
(45) Date of Patent: May 13, 2014

(54) SYSTEM AND METHOD FOR MANAGING A VIRTUAL SWAP FILE FOR VIRTUAL ENVIRONMENTS

(75) Inventors: Pavel Emelianov, Moscow (RU); Kirill Korotaev, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 133 days.

(21) Appl. No.: 13/446,676

(22) Filed: Apr. 13, 2012

Related U.S. Application Data

(60) Provisional application No. 61/475,691, filed on Apr. 15, 2011.

(51) Int. Cl.
*G06F 12/00* (2006.01)
*G06F 9/46* (2006.01)

(52) U.S. Cl.
USPC ........ 711/159; 711/6; 711/104; 711/E12.016; 718/104

(58) Field of Classification Search
USPC ................................ 711/6, 104, 159; 718/104
See application file for complete search history.

(56) References Cited

U.S. PATENT DOCUMENTS

| 7,461,148 | B1* | 12/2008 | Beloussov et al. | 709/226 |
| 7,624,240 | B1* | 11/2009 | Colbert et al. | 711/159 |
| 7,665,090 | B1* | 2/2010 | Tormasov et al. | 718/104 |
| 2007/0294496 | A1* | 12/2007 | Goss et al. | 711/163 |
| 2009/0006801 | A1* | 1/2009 | Shultz et al. | 711/170 |

* cited by examiner

*Primary Examiner* — Aracelis Ruiz
(74) *Attorney, Agent, or Firm* — Bardmesser Law Group

(57) ABSTRACT

A computer system has a random access memory (RAM) that stores currently used memory pages and SWAP storage for storing memory page that is not in use. If the process requires memory page stored on the SWAP storage, a corresponding page is loaded to RAM. If the page in RAM is not currently in use, it is moved to the SWAP storage. The computer system has a number of Virtual Environments (i.e., Containers) that run their own processes, a VE/Container RAM and a virtual SWAP storage. The Container processes have access to a VE/Container RAM. When the Container process request OS for memory, the memory manager allocates memory pages in the RAM and also allocates memory pages for the Container process in the VE/Container RAM. If no free virtual RAM is available, the process data is moved to the virtual SWAP storage.

7 Claims, 6 Drawing Sheets

SYSTEM AND METHOD FOR MANAGING A VIRTUAL SWAP FILE FOR VIRTUAL ENVIRONMENTS

CROSS-REFERENCE TO RELATED APPLICATIONS

This application claims priority of a Provisional U.S. Patent Application No. 61/475,691, filed on Apr. 15, 2011, incorporated by reference herein in its entirety.

BACKGROUND OF THE INVENTION

1. Field of the Invention

This invention relates to a method and system for memory management in virtual environments, and more particularly to a virtual SWAP for Virtual Environments (VE), such as Parallels Containers.

2. Description of the Related Art

Virtualization in computer systems presents some challenges with regard to memory management among isolated virtual environments. In Containerized environments all Containers use the same virtual memory. Each Container can consume the entire memory. Therefore, the amount of memory used by the Containers needs to be limited.

Modern OS-es use two types of memory—random access memory or RAM (fast direct accesses, but limited in quantity) and SWAP file (slow, not directly accessible but almost unlimited). Typically, if a process requires memory, the OS allocates some memory from the RAM. If no free RAM is available, some of the process-related data is moved from the RAM to a SWAP file. The direct access from processes to this RAM is marked to notify the OS that the data is moved to SWAP file and the RAM can be used for storing data from other processes.

A conventional use of a memory SWAP file is illustrated in FIG. 1. A page request is received in step 110. In step 112, process determines if an RSS (resident set size, a number of pages currently residing in RAM) exceeds the RAM size. If the RAM has some free space, the number of currently residing pages is increased in step 114 and page is allocated in step 118. Then the memory allocation is finished in step 120.

If, in step 112, it is determined that the RAM does not have any free space, it is checked if SWAP file has not reached the limit (see step 116). If the SWAP file is at the limit, the system is out of memory (step 128) and the number of resident pages in SWAP file is increased in step 126. If, in step 116, the SWAP file is under the limit, the page is found in LRU (least recently used set) in step 122 and the page is written to SWAP file in step 124, then the number of resident pages is increased in step 126.

When the process attempt to access the data that is currently resides in SWAP file, the OS this data back to the RAM and sets up the direct access to this data again. Hosting of the SWAP file is described in http:**kerneltrap.org/node/3660.

However, none of the memory management systems that limit memory consumption work with Containers in virtual execution environment to manage memory on a per-Container basis. Accordingly, there is a need for a system and method that limit the virtual memory usage by the Containers using SWAP file.

SUMMARY OF THE INVENTION

Accordingly, the present invention is related to a system and method for memory SWAP file for the Container (a type of Virtual Environment) that substantially obviates one or more of the disadvantages of the related art.

A computer system has a random access memory (RAM) that stores currently used memory pages and SWAP storage for storing memory page that is not in use. If the process requires memory page stored on the SWAP storage, a corresponding page is loaded to RAM. If the page in RAM is not currently in use, it is moved to the SWAP storage. The computer system has a number of virtual environments—VEs (for example, Containers) that run their own processes, a VE/Container RAM and a virtual SWAP storage. The Container processes have access to a VE/Container RAM.

When the Container process requests memory from the OS, the memory manager allocates memory pages in the RAM and also allocates memory pages for the Container process in the VE/Container RAM. If no free VE/Container RAM is available, the process data is moved to a virtual SWAP file. The VE/Container RAM is stored in physical RAM.

An aggregate volume of RAM used by the Containers in the virtual environment and by the Host OS is different from entire accessible volume of the operating memory by a $\Delta$ volume. The $\Delta$ volume can be larger than zero or equal to zero. The $\Delta$ volume is used to cache virtual swap pages in RAM before putting them to the real SWAP area. The $\Delta$ volume can be pre-set for the system or it can be set based on the memory unused by other Containers.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
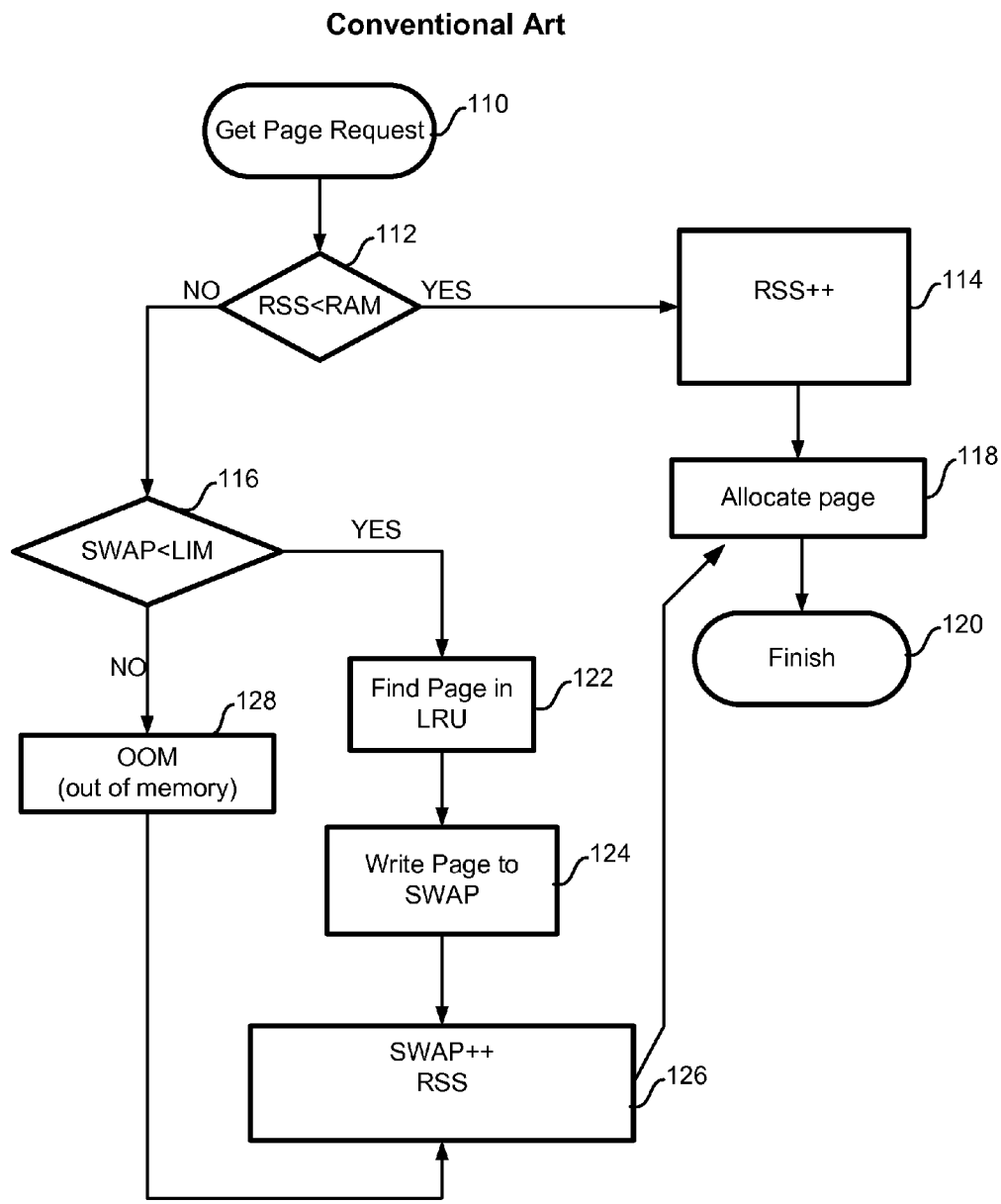
FIG. 1 illustrates conventional use of memory SWAP file.
Figure 2:
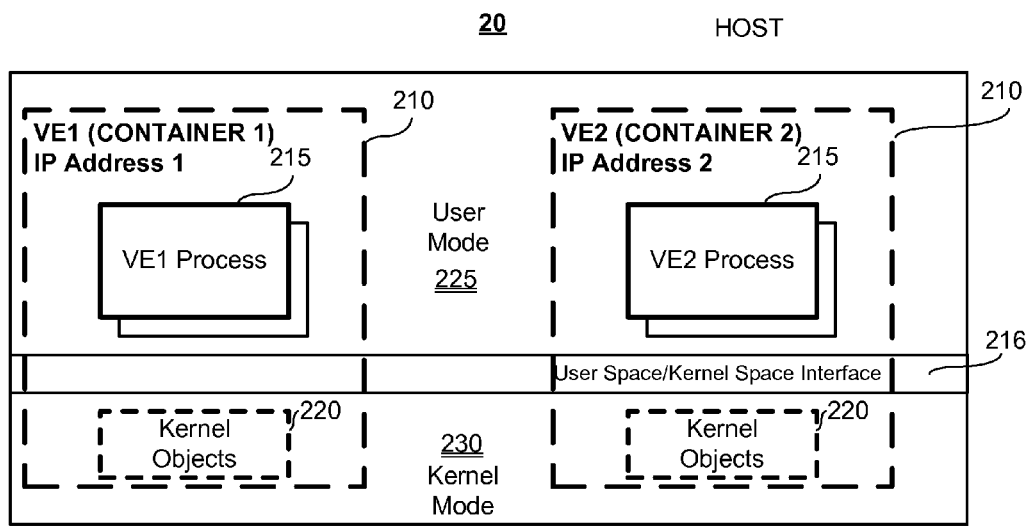
FIG. 2 illustrates exemplary Virtual Environments (Containers) implemented on a host.

The present invention is directed to the memory management in virtual environment and more particularly to management of the per-Container memory consumption. The Container, in the exemplary embodiment, is an isolated Virtual Environment (VE), where multiple containers share services of a single OS (and virtualize the same OS from the perspective of the Container clients). FIG. 2 illustrates exemplary VEs (in one embodiment, Containers, or Virtual Private Servers, such as marketed by Parallels, the assignee of this application) implemented on a host computer.

Each Container 210 has its own virtual address space (or its own set of addresses), which includes memory, IP addresses, disk drive addresses, SMB network names [WHAT IS SMB?], TCP names, pipe names, etc. Each Container 210 has its own objects 220 and data structures. Each of the objects 220 and the data structures of each Container have a unique identifier in a context of the operating system kernel 230. Kernel abstraction layer 216 serves as an interface between user space 225 and kernel space 230, for virtualizing the OS. The VEs/Containers share the kernel and request services from the kernel using an API, or similar mechanisms.

Each Container 210 cannot affect data structures of another Container, or objects of another Container, and cannot access information about processes running on another Container. Each Container 210 includes isolation of address space of each user from address space of a user on any other Container, isolation of server resources for each Container, and isolation of application program failure effects on any other Container.

The server resources include any of a virtual memory allocated to each user, a pageable memory allocated in the OS kernel to support the Containers, a pageable memory used by the OS kernel for support of user processes either in shared, or in exclusive form (i.e., either in support of user processes of one Container, or in support of user processes of multiple Container s), a resident memory allocated in the OS kernel, physical memory used by the user processes, a share of CPU resources, security descriptors (or other identifiers related to the rights of the users and the Container s), objects and data structures used by the OS kernel, I/O interfaces and their utilization level by the particular Container, file and/or disk space, and individual user resource limitations.

Each Container 210 typically includes a plurality of processes 215, each with at least one thread servicing corresponding users, a plurality of objects associated with the plurality of threads, a set of user and group IDs that unique in the context of a Container corresponding to users and groups of a particular Container, a set of configuration settings corresponding to each Container stored within the Container and a corresponding set of configuration settings for all Container s stored by the kernel, a unique file space, means for management of the particular Container, means for management of services offered by the particular Container to its users, and means for delivery of the services to the users of the particular Container.

According to an exemplary embodiment, when the Container process 215 request OS for memory, the memory manager allocates memory pages in the RAM and also allocates memory pages for the Container process in the VE/Container RAM.

If no free VE/Container RAM is available, the process data is moved to a virtual SWAP file. The VE/Container RAM is stored in a physical RAM. An aggregate volume of RAM used by the Containers (VEs) and by the Host OS is different from entire accessible volume of the operating memory by Δ volume. The Δ volume can be larger than zero or equal to zero. The Δ volume together with the real volume of the SWAP file is used for the real SWAP file. The Δ volume can be pre-set for the system or it can be set based on the memory unused by other Containers. The present approach thus handles RAM quota for each container. Indeed, the Δ may be used for caching swapped data and thereby increase the speed of I/O operations. If the pages in Δ have to be moved to the Container's RAM, it is not copied. Instead, it is unmapped from virtual swap and mapped to RAM of container.

According to the exemplary embodiment, the per-Container amount of available RAM and SWAP file space are configured and the per-Container memory consumption is managed. When a Container hits its RAM limit, the data stays in RAM, but the direct access to it is reconfigured to notify the OS kernel that the Container has reached the limit. Later, when there is no RAM left (i.e., the actual RAM is full, as opposed to just the Container-allocated RAM being full), this data is moved to the SWAP file.

When a Container process accesses the data which is not accessible directly, the data is not moved back to RAM. Instead, just the direct access is returned back. The SWAP limit is not global and it is set per-Container. The process to be notified is selected from the respective Container.

Figure 3:
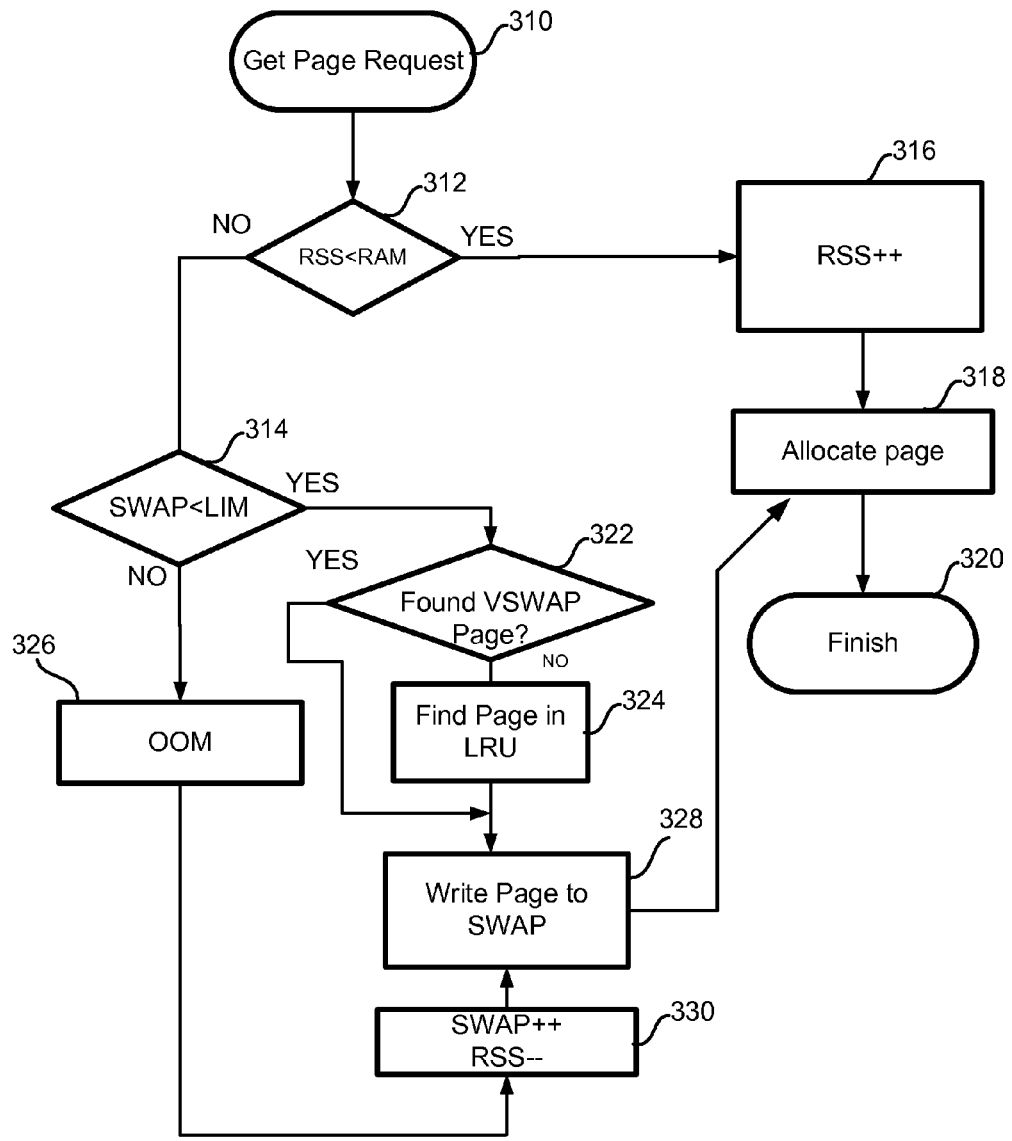
FIG. 3 illustrates using a virtual memory SWAP file, in accordance with the exemplary embodiment.

FIG. 3 illustrates using a virtual memory SWAP file, in accordance with the exemplary embodiment. A page request is received in step 310. In step 312, process determines if a number of pages currently residing in RAM exceed the RAM size. If the RAM has some free space, the number of currently residing pages is increased in step 316 and page is allocated in step 318. Then the memory allocation is finished in step 320.

If, in step 312, it is determined that the RAM does not have any free space, the system checks if SWAP file has not reached the limit (see step 314). If the SWAP file is at the limit, the system is out of memory (step 326) and the number of resident pages in SWAP file is increased in step 330. If, in step 314, the SWAP file is under the limit, in step 322, the process determines if a page is found in a virtual SWAP file.

If the page is found, the page is written to SWAP file in step 328 and a number of currently residing pages is increased in step 330. If, the page is not found in virtual SWAP file in step 322, the process finds the page in LRU (least recently used set) in step 324, and the page is written to SWAP file in step 328, and then the number of resident pages is increased in step 330.

Figure 4:
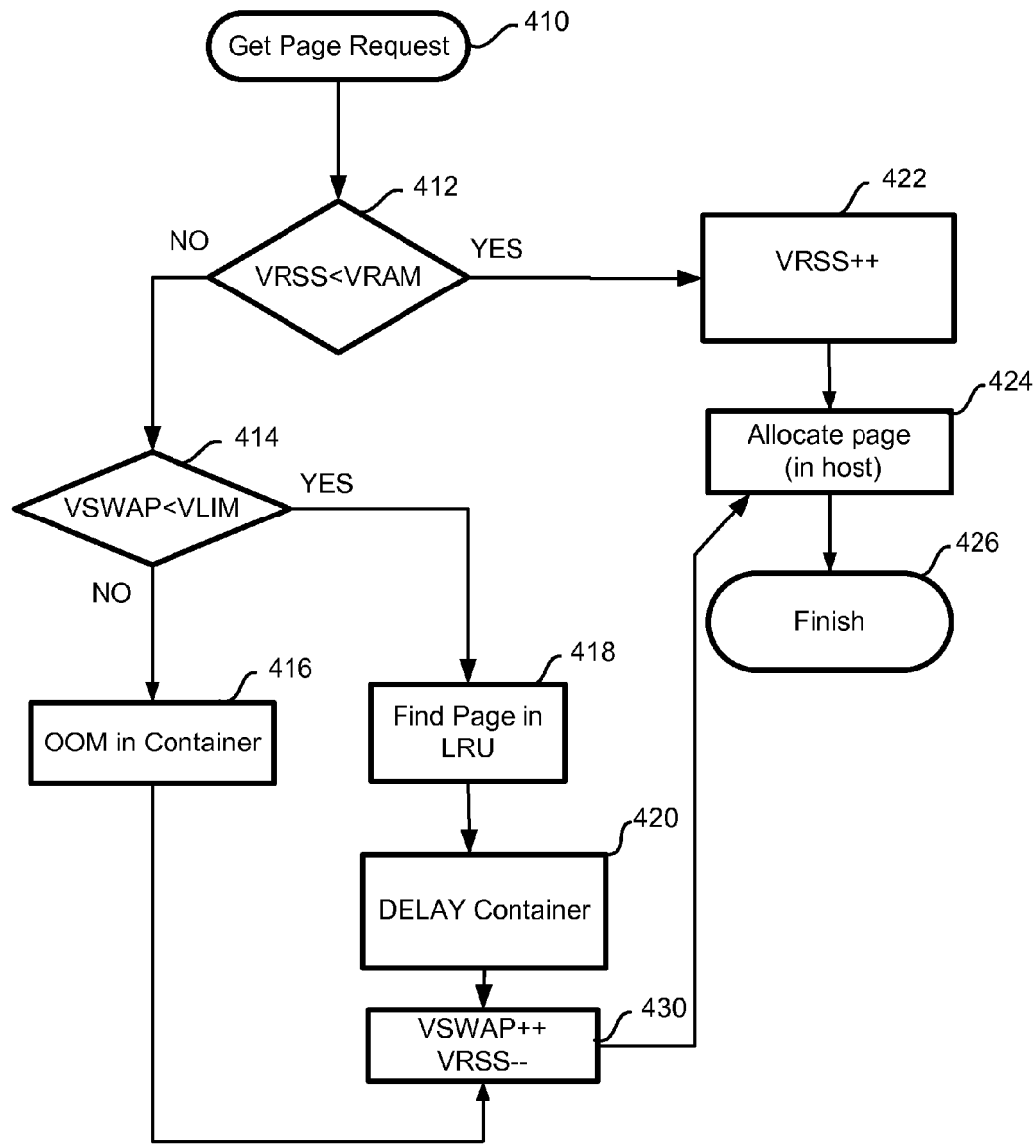
FIG. 4 illustrates the process of memory management for Container using virtual memory, in accordance with the exemplary embodiment.

FIG. 4 illustrates the process of memory management for Container using virtual memory, in accordance with the exemplary embodiment. As shown in FIG. 4, a page request is received in step 410. In step 412, process determines if a number of virtual pages currently residing in VE/Container RAM exceed the VE/Container RAM size. If the VE/Container RAM has some free space, the number of currently residing pages is increased in step 422 and page is allocated in step 424. Then the memory allocation is finished in step 426.

If, in step 412, the system determines that the VE/Container RAM does not have any free space, the system checks if virtual SWAP file has not reached the limit (see step 414). If the virtual SWAP file is at the limit (for the particular Container), the Container is out of memory (step 416) and the number of pages (VRSS) currently residing in the virtual SWAP file is increased in step 420. If, in step 414, the virtual SWAP file is under the limit (for the particular Container), in step 418, the system finds the page in LRU (least recently used) list of pages. The Container is delayed (i.e., briefly suspended) in step 420 and a number of currently residing virtual pages is increased in the virtual SWAP file in step 430.

In a conventional situation, when pages are swapped out of RAM to the disk, there is a delay caused by a disk that normally operates much slower than the RAM. In the exemplary embodiment, swapped out page is moved to the RAM rather than to the disk. Thus, the delays associated with the page SWAP are much shorter.

Therefore, the behavior of the SWAP is different (in terms of the time required), and the page SWAP is delayed artificially using the CPU scheduler (i.e., the scheduler does not give time to the thread until some future point in time, as would have happened if this were an ordinary SWAP). The OS scheduler handles the CPU scheduler, although a procedure in virtual swap supporting software gives a command to the scheduler to delay the task inside Container(s) Note that each Container can have its own virtual SWAP file limit. Initially, the RAM quota is assigned to the container by an Admin or by using physical node rules (which are initially set up by an Admin as well). RAM size for virtual swapping is used for all containers then.

Figure 5:
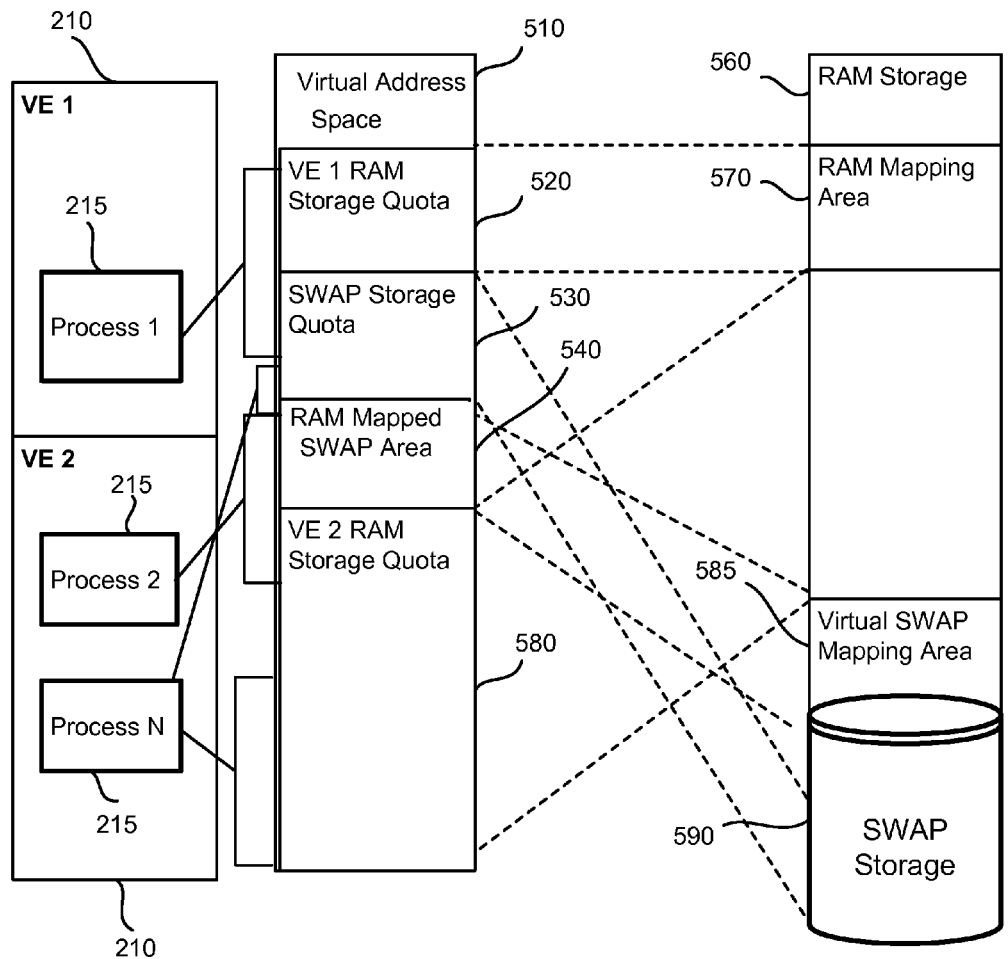
FIG. 5 illustrates SWAP system, in accordance with the exemplary embodiment.

FIG. 5 illustrates a system according to the exemplary embodiment. VEs (Containers/VE 1 and VE 2) 210 run in user mode as also shown in FIG. 2. Each of the Containers 210 has processes 215 that run within each VE (Container) 210. VE1 has an allocated VE 1 RAM storage quota 520 and VE2 has an allocated VE 2 RAM storage quota 580 located within a virtual address space 510. The virtual storage space also has pre-allocated SWAP storage quota 530 and RAM mapped SWAP area 540.

The RAM storage quotas 520 and 580 are reflected by the RAM mapping area 570 located on RAM storage 560. Swap RAM is mapped to the host or to vps0. Quotaed RAM is mapped to VPS processes. A virtual SWAP mapping area 585 is also located on the RAM storage 560. The virtual SWAP mapping area 585 contains SWAP storage 590.

A system process determines if a number of virtual pages currently residing in VE RAM storage quotas 520 and 580 exceed the size of the virtual address space 510. If the virtual address space 510 has some free space, the number of currently residing pages is increased and page is allocated.

If the system determines that the virtual address space does not have any free space, the system checks if the virtual SWAP storage quota 530 has not reached the limit. If the virtual SWAP storage quota 530 is at the limit (for the Container), the Container is out of memory and the number of pages currently residing in the virtual SWAP storage 530 is increased. If the virtual SWAP storage quota 530 is under the limit (for the Container), the system finds the page in LRU (least recently used) list of pages. The Container is delayed and a number of currently residing virtual pages is increased in the virtual SWAP storage 590.

Those skilled in the art will appreciate that a system and method of the exemplary embodiment limit the virtual memory usage by the VEs, such as Containers, by advantageously using the SWAP file or storage.

The model described above can be extended to control other types of memory in a Container. For example, on a standalone LINUX box, special attention is paid to so-called "dirty" and "writeback" memory. Dirty pages are the amount of data that should be flushed on disk (typically these are disk cache pages that were modified). The writeback pages are the memory that is currently being written to disk (in most cases this is formerly "dirty" memory).

Linux kernel memory management accounts for these two memory types to improve various activities within the kernel. The "dirty" memory accounting is required to prevent Denial of Service attacks when some app constantly writes data into page cache.

The "writeback" memory accounting is used for the same flush in the memory reclaiming code (which scans the mentioned LRU lists to find out what pages to free) to prevent live-locks on block layer. Having per-Container management of memory in a way described before allows accounting for both mentioned "dirty" and "writeback" memory to provide the same QoS for containers as Linux kernel provides for standalone boxes. This way, when one Container goes over its limit for dirty memory, other Containers' dirty limits can be used, so that the overall limit is preserved. This can be done transparently to the Containers themselves.

On NUMA systems (Non-Uniform Memory Access, see http**//msdn.microsoft.com/en-us/library/ ms178144%28v=sql.105%29.aspx, incorporated herein by reference) when a task migrates from one NUMA node to another, the LINUX kernel also moves the memory that this task uses from its old node to the new one. In order to preserve the LRU order of these pages, a complex procedure is used— the memory is marked as "not-present" for this task and then the pages are moved on-demand, when a task starts accessing it.

With per-Container memory management as described herein, it is possible to migrate the whole Container from one node to another while preserving its LRU state—the LRU order is already known, and thus can be simply copied from one NUMA node to another. The LRU list is stored for each Container, rather than for the entire node.

As a further option, the memory management described herein can be used for a "rebootless upgrade", which checkpoints a Container to RAM and then replaces an old kernel with a new one. The per-Container memory management allows finding the Container's memory to pin in RAM in an easier way. Knowing which exact new page a particular container is using permits to quickly detect ages related to container and move them from quotaed RAM to the SWAP, without scanning page tables related to certain tasks.

Figure 6:
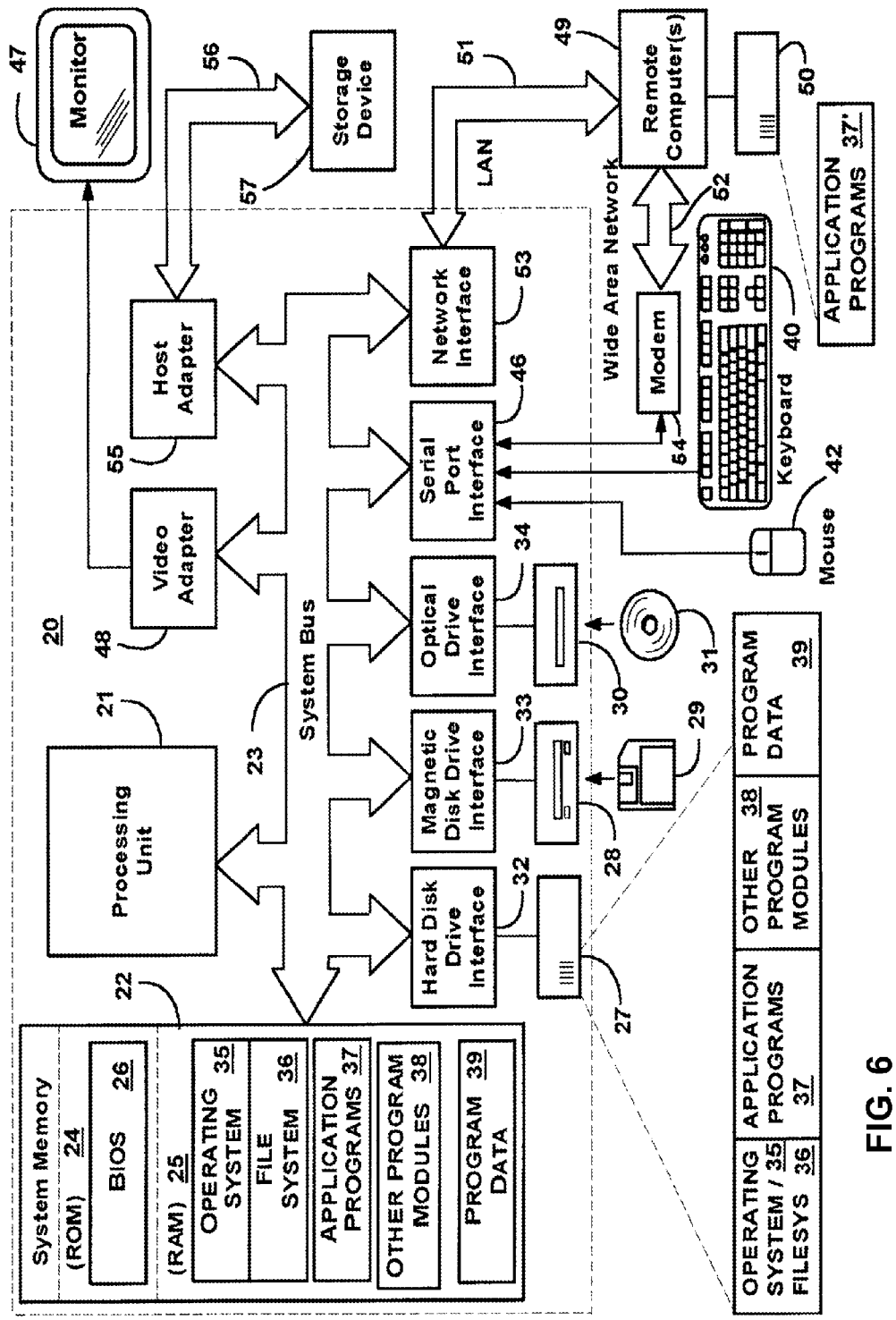
FIG. 6 illustrates an example of a computer on which the invention may be implemented.

With reference to FIG. 6, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for sharing memory among multiple Containers, the system comprising:
    an operating system (OS);
    a random access memory (RAM) for storing currently used memory pages;
    a SWAP storage for storing memory pages that are currently not in use;
    a plurality of Virtual Environments (VEs) running under the OS, and sharing services of the OS;
    at least one VE process running in each VE;
    a VE RAM implemented under the OS;
    a virtual SWAP storage implemented under the OS;
    a memory manager that provides access to the RAM by the VE process;
    wherein:
        when the VE process requests memory from the OS, the memory manager allocates memory pages in the RAM and allocates memory pages for the VE process in the VE RAM,
        if the VE RAM has no free space, the VE process pages are moved to the virtual SWAP storage,
        if the VE process requires a memory page stored in the virtual SWAP storage, the page is loaded to the RAM, and
        if the process page in the RAM is not currently in use, the page is moved to the SWAP storage,
        wherein, if the memory page required by the VE process is not in the virtual SWAP storage, a system process finds the memory page in a least recently used set and writes it to the SWAP storage.

2. The system of claim 1, wherein per-VE amounts of available RAM and the SWAP storage spaces are pre-configured.

3. The system of claim 1, wherein a page SWAP is delayed artificially by a CPU scheduler.

4. A system for sharing memory among multiple Containers in a virtual environment, the system comprising:
    a processor;
    a memory couple to the processor;
    a computer program logic stored in the memory and executed on the processor for implementing the:
    launching an operating system (OS);
    storing currently used memory pages in a random access memory (RAM);
    storing memory pages that are currently not in use in a SWAP storage;
    launching a plurality of Virtual Environments (VEs) under the OS, wherein the VEs share services of the OS;
    wherein at least one VE process running in each VE;
    wherein each VE accesses a VE RAM;
    wherein each VE accesses a virtual SWAP storage implemented under the OS;
    wherein a memory manager provides access to the RAM used by the VE process;
    allocating memory pages in the RAM and allocating memory pages for the VE process in the VE RAM when the VE process requests memory from the OS,
    moving the VE process pages to the virtual SWAP storage if the VE RAM has no free space,
    loading a memory page into the VE RAM if the VE process requires a memory page stored in the virtual SWAP storage, and
    moving a memory page to the SWAP storage if the memory page in the VE RAM is not currently in use,
    when the memory page required by the VE process is not in the virtual SWAP storage, finding the memory page in a least recently used set and writing it to the SWAP storage.

5. A system for sharing memory among multiple Virtual Environments (VEs), the system comprising:
    a host operating system (OS);
    a random access memory (RAM) for storing currently used memory pages;
    a SWAP storage for storing memory pages that are currently not in use;
    a plurality of VEs running under the host OS;

at least one VE process running in each VE;
a VE RAM implemented under the host OS;
a virtual SWAP storage implemented under the OS; and
a memory manager that provides the VE process access to the RAM;
wherein:
when the VE process requests memory from the host OS, the memory manager allocates memory pages in the RAM and allocates memory pages for the VE process in the VE RAM,
if the VE RAM has no free space, the VE process pages are moved to the virtual SWAP storage,
if the VE process requires a memory page stored in the virtual SWAP storage, the page is loaded to the RAM, and
if the process page in the RAM is not currently in use, the page is moved to the SWAP storage, and
if the memory page required by the VE process is not in the virtual SWAP storage, a least recently used memory page is written to the SWAP storage.

6. The system of claim 5, wherein the VEs are Virtual Private Servers.

7. A method for sharing memory among multiple Virtual Environments (VEs), the method comprising the steps of:
launching an operating system (OS);
storing currently used memory pages in a random access memory (RAM);
storing memory pages that are currently not in use in a SWAP storage;
launching a plurality of Virtual Environments (VEs) under the OS, wherein the VEs share services of the OS;
wherein at least one VE process running in each VE;
wherein each VE accesses a VE RAM;
wherein each VE accesses a virtual SWAP storage implemented under the OS;
wherein a memory manager provides access to the RAM used by the VE process;
allocating memory pages in the RAM and allocating memory pages for the VE process in the VE RAM when the VE process requests memory from the OS,
moving the VE process pages to the virtual SWAP storage if the VE RAM has no free space,
loading a memory page into the VE RAM if the VE process requires a memory page stored in the virtual SWAP storage, and
moving a memory page to the SWAP storage if the memory page in the VE RAM is not currently in use,
when the memory page required by the VE process is not in the virtual SWAP storage, finding the memory page in a least recently used set and writing it to the SWAP storage.

* * * * *